United States Patent [19]

Smith

[11] Patent Number: 5,445,111
[45] Date of Patent: Aug. 29, 1995

[54] ELECTRIFIED FISH BARRIERS

[75] Inventor: David V. Smith, Vancouver, Wash.

[73] Assignee: Smith-Root, Inc., Vancouver, Wash.

[21] Appl. No.: 81,785

[22] Filed: Jun. 22, 1993

[51] Int. Cl.$^6$ ............................................. H04B 13/02
[52] U.S. Cl. .................... 119/220; 405/127; 340/852
[58] Field of Search .............. 119/219, 220, 174; 307/106, 107, 108; 405/81, 127; 340/852; 43/17.1

[56] References Cited

U.S. PATENT DOCUMENTS

| | | | |
|---|---|---|---|
| 2,146,105 | 2/1939 | Baker | 119/220 |
| 2,233,045 | 2/1941 | Bonner et al. | 119/220 |
| 2,778,140 | 1/1957 | Applegate et al. | 405/81 |
| 2,826,897 | 3/1958 | Vinsonhaler et al. | 61/21 |
| 4,580,525 | 4/1986 | Marzluf | 119/220 |
| 4,750,451 | 6/1988 | Smith | 119/220 |
| 5,078,542 | 1/1992 | Yoshikawa et al. | 405/127 |

FOREIGN PATENT DOCUMENTS 646967  2/1979  U.S.S.R. ............................. 119/220

OTHER PUBLICATIONS

"Conceptual Report Proposed Installation of an Electrical Fish Barrier at Pump House 2," Prepared by Smith-Root, Inc., Jul. 1, 1992, 52 pages.
Andrew et al., "Electric Screens for Adult Salmon," International Pacific Salmon Fisheries Commission, 1956, 43 pages.
Smith-Root, Inc. GFFB/GFFG Fish Barrier & Guidance Systems, Jan., 1992, 20 pages.
Stewart, "Electric Screens," International Symposium on Fishing with Electricity, Oct. 3, 1988, 8 pages.
Davis, "An Investigation of Barriers to Introduction of Fish into Granite Reef Dam Forebay From an Interconnection with the Cap Aqueduct", Environmental Services Department, Jul., 1984, 18 pages.
McLain, "The Control of the Upstream Movement of Fish with Pulsated Direct Current," U.S. Department of the Interior, pp. 269–284.
McLain et al., "Directing the Movement of Fish with Electricity," U.S. Department of the Interior, Jan., 1953, 24 pages.
Burrows, "Diversion of Adult Salmon by an Electrical Field," U.S. Department of the Interior, Dec., 1957, 11 pages.
Stewart, "Electrified Barriers for Marine Fish," International Symposium on Fishing with Electricity, 26 pages.
Brett et al., "Research on Guiding Young Salmon at Two British Columbia Field Stations," Bulletin No. 117, 1958, pp. 29–57.
Holmes, "History, Development, and Problems of Electric Fish Screen," Special Scientific Report No. 53, U.S. Department of the Interior, Jun., 1948, 62 pages.

(List continued on next page.)

*Primary Examiner*—Todd E. Manahan
*Attorney, Agent, or Firm*—Klarquist Sparkman Campbell Leigh & Whinston

[57] ABSTRACT

A variety of electrified fish barriers are suitable for diverting fish from protected structures, e.g. pump intakes. Most take the form of linear curtain arrays (i.e. arrays of fixedly spaced-apart vertical elements). Many are characterized by the use of three or more pulsed driving signals of different voltages. This results in an electrical field pattern that extends broadside of the array, permitting fish an opportunity to turn and swim away before reaching a dangerous field strength. One barrier advantageously integrates the electrodes with a physical control structure that can be used to equalize the through-barrier water flow along its length. Others employ sets of electrodes that are driven in staggered, time-multiplexed fashion so as to reduce peak power requirements. Barriers used to screen pump intakes on the sides of flowing waterways are desirably sized and placed so that the velocity of water flow through the barrier is one-half, or less, of the waterway bypass flow adjacent the barrier. Other barriers include electrodes with horizontal and vertical sections (i.e. "U" shaped), while still others have electrodes that are driven at both ends. A variety of other details are also disclosed.

10 Claims, 6 Drawing Sheets

OTHER PUBLICATIONS

"Impingement and Entrainment: An Updated Annotated Bibliography," EPRI EA-1855, The Atomic Industrial Forum, Inc., May, 1981, 317 pages.

Cada et al., "A Biological Evaluation of Devices Used for Reducing Entrainment and Impingement Losses at Thermal Power Plants," Publication No. 1276, Environmental Sciences Division, 1978, 50 pages.

"General Fish Screening Criteria," California Department of Fish and Game, Feb. 1993, 2 pages.

"Fish Screening Criteria for Anadromous Salmonids," National Marine Fisheries Service Southwest Region, Apr. 1992, 8 pages.

"The Establishment and Operation of Electrical Barriers to Sea Lamprey Migration on the Canadian Tributaries to Lake Superior," Fisheries Research Board of Canada, Sep., 1959, 21 pages.

ELECTRIFIED FISH BARRIERS

FIELD OF THE INVENTION

The present invention relates to electrified fish barriers, and more particularly—although not exclusively—to electrified fish barriers used to exclude fish from the intakes of pumping stations or diversions along rivers, canals or other flowing waters.

BACKGROUND AND SUMMARY OF THE INVENTION

Electric fish barriers have been used for decades to constrain the movement of fish in waterways such as rivers and reservoirs. Exemplary is U.S. Pat. No. 4,750,451 (incorporated herein by reference), in which electrodes extend across the bottom of a river and are pulsed synchronously to prevent fish from migrating upstream. The amplitude of pulses applied to each electrode can be controlled independently, permitting a user to tailor a desired field gradient profile to approaching fish. In the illustrated embodiment, the potential difference between adjacent electrodes increases as the fish moves upstream (i.e. voltages of 0 v., 100 v., 300 v., 600 v., 1000 v.—a so-called "graduated field").

While the foregoing arrangement utilizes horizontally oriented electrodes, arrangements utilizing vertically oriented electrodes are also known. In one such system 10, shown in FIG. 1a, a plurality of elongated electrodes (e.g. pipes) 12 are positioned in a river, forming a "curtain array" 14. In this system, a power supply 16 (either A.C. or D.C.) provides a single potential difference, with alternating electrodes being driven with the same voltage. (In this and all succeeding embodiments, it should be understood that the electrodes are not in direct contact with the ground beneath the water.)

Figure 1A:
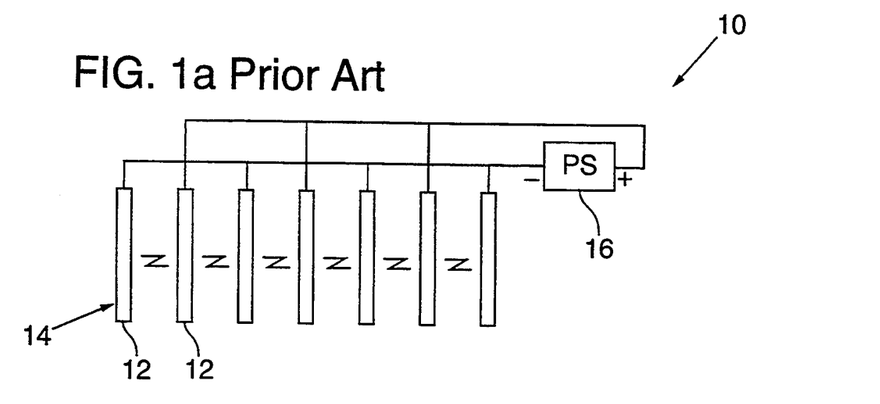
FIG. 1a is a side view of a prior art curtain array fish barrier in which every second electrode is driven with the same potential.

The foregoing arrangement has a number of disadvantages. One of the most serious is that the resulting electrical field does not extend far from the array. Instead, the electrical field lines are concentrated close to the array's axis, with the orientation of the electric field between the electrodes. Consequently, fish encounter the barrier with little or no forewarning and are thus often injured or killed when they suddenly encounter the strong fields extending directly between electrodes. Further, electric fields are most effective when they have a component extending lengthwise of the fish (its greatest dimension). In the FIG. 1 arrangement, the field lines traverse the fish essentially from side to side.

Figure 1B:
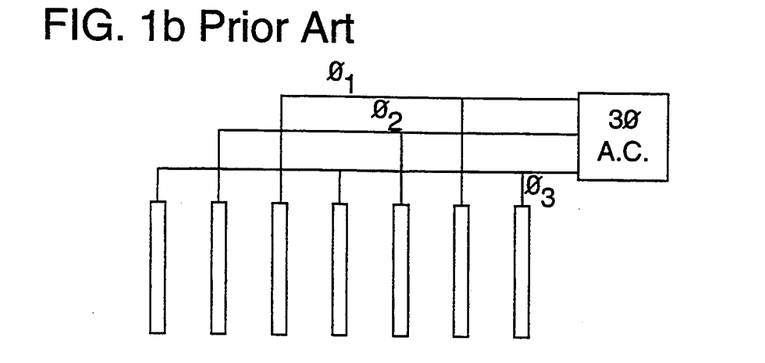
FIG. 1b shows an arrangement like FIG. 1a except driven by three-phase A.C., so that every third electrode is driven with the same signal.

FIG. 1b shows a system having an electrode configuration like that of FIG. 1a, but driven with three-phase AC. This arrangement overcomes some of the problems of the FIG. 1 array but introduces others (i.e. AC fish barriers are generally more stressful and tend to kill and injure fish).

Figure 2:
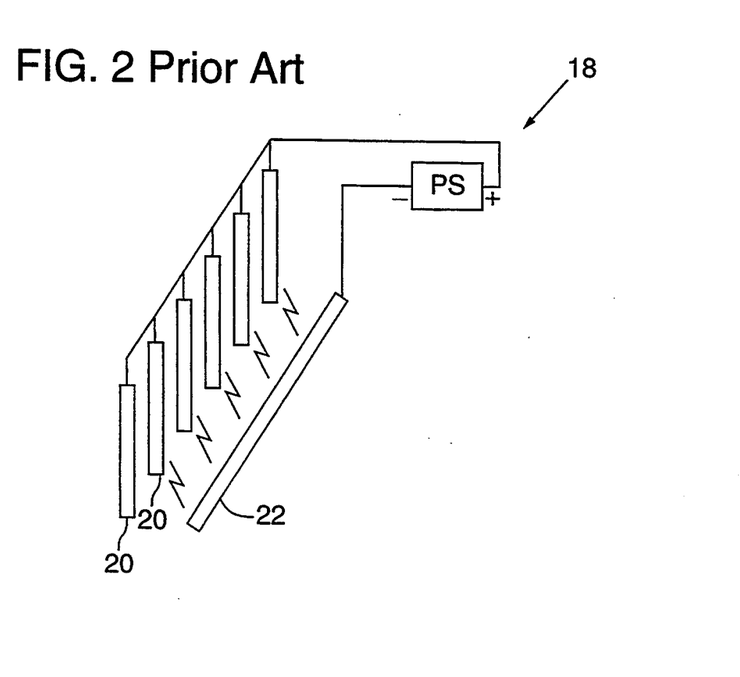
FIG. 2 is a perspective view of a prior art curtain array fish barrier in which vertical electrodes are driven with one polarity and a horizontal electrode is driven with the other.

In FIG. 2, another curtain array barrier 18 is shown. In this system, however, all of the vertical electrodes 20 are driven with the same polarity signal. A second electrode 22 (usually positioned on the bottom) is driven with the other polarity and provides the requisite potential difference.

While generally an improvement over the FIG. 1 system, the FIG. 2 arrangement still suffers, inter alia, by reason of the electrical field geometry. While spacing the second electrode 22 away from the vertical electrodes 20 causes the electrical field to extend out from the he curtain array, the field is highly depth-dependent. Further, the field is still largely confined to the region between the cooperating electrodes.

Figure 3A:
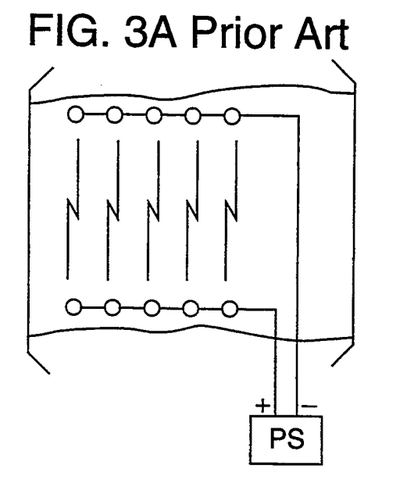
FIG. 3a is a top plan view of a prior art barrier in which a plurality of vertical electrodes are disposed on each side of a channel and a potential difference applied across the channel.

FIG. 3a shows yet another prior art arrangement. In this system, a plurality of vertical electrodes are disposed on each side of a waterway. Those on one side are driven from one terminal of the power supply, those on the other side are driven with the other, providing a potential difference (again A.C. or D.C.) across the waterway. This system has many of the same drawbacks as those noted earlier.

Figure 3B:
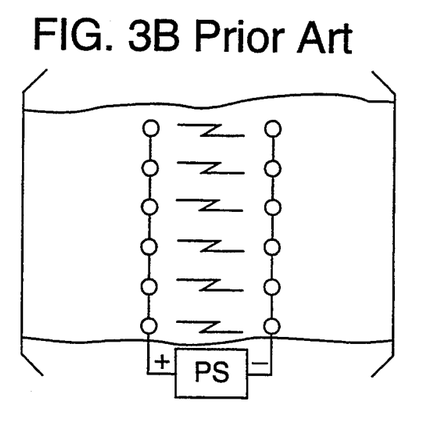
FIG. 3b shows an arrangement like FIG. 3a but in which the two rows of electrode are disposed across, rather than alongside, the waterway.

A variant, shown in FIG. 3b, has the rows of electrodes disposed across, rather than alongside, the waterway.

U.S. Pat. No. 5,078,542 shows a fish barrier associated with an intake watercourse to a power plant or the like. The walls of the watercourse are inclined outwardly and have electrodes formed therein. A power supply provides a potential difference between the electrodes on one wall and those on the other.

Like the foregoing arrangements, the system described in this patent suffers, inter alia, by reason of its field geometry. As with the other systems, the field fails to penetrate much beyond the region directly between the cooperating electrodes. As a consequence, fish have little warning of the barrier until they are suddenly exposed to a relatively strong field. Further, the field lines are oriented 90 degrees away from the optimal orientation (i.e. traversely across the fish rather than lengthwise).

While the foregoing discussion has focused on electrical fish barriers, it should be mentioned that other barrier mechanisms have been tried as well. U.S. Pat. No. 2,826,897, for example, shows a louver-based barrier used to screen fish from turbine intakes in a dam or the like. The disclosed louvers create localized turbulence which the fish swim to avoid. The fish are thereby channeled to a relatively small waterway bypassing the turbine intakes. This patent also discloses the use of trash racks to screen waterborne debris (e.g. logs) from the louvers.

While louver-based barriers are well suited for some applications, they are ill-suited for many others. As noted, one problem is their tendency to clog with waterborne debris. Another is that they are inefficient with small fish.

In its different aspects, the present invention seeks to remedy the above-described and other drawbacks of the prior art, and to provide advantages not heretofore contemplated.

The foregoing and additional features and advantages of the present invention will be more readily apparent from the following detailed description, which proceeds with reference to the accompanying drawings.

DETAILED DESCRIPTION

Figure 4:
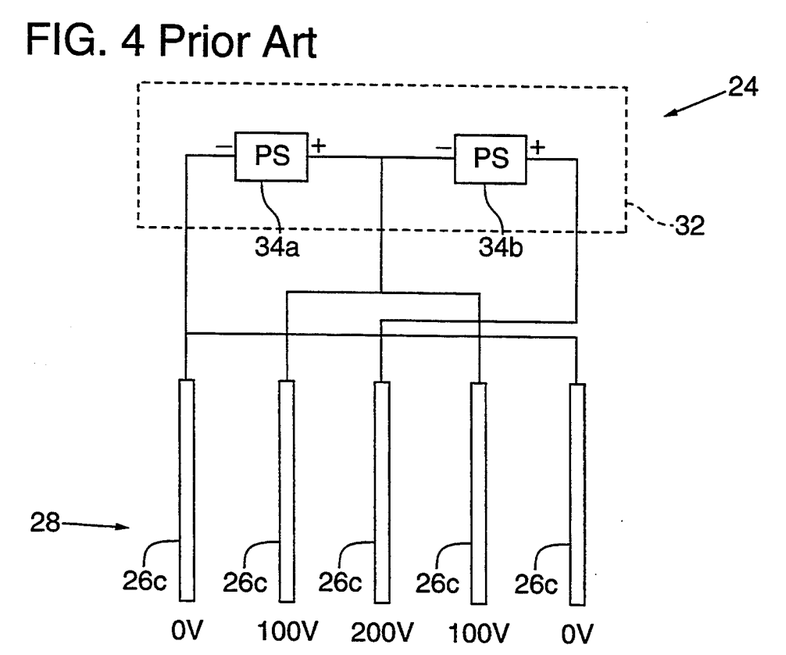
FIG. 4 illustrates a fish barrier according to one embodiment of the present invention.

As shown in FIG. 4, a fish barrier 24 according to one embodiment of the present invention includes a plurality of electrodes 26 which are vertically oriented and fixedly spaced apart so as to define a curtain array 28. The array can be positioned in any body of water, either flowing (e.g. a river or canal) or stationary (e.g. a lake or reservoir). A power supply system 32 powers the array and is operative to provide additive polarity signals to successive electrodes.

In the illustrated embodiment, the power supply system 32 includes two power supplies 34 of the sort disclosed in U.S. Pat. No. 4,750,451 or in application Ser. No. 07/924,332, filed Jul. 31, 1992, attached hereto as Appendix A, both of which are incorporated by reference. These supplies are desirably characterized by their ability to provide a pulsed DC output signal whose amplitude, pulse width and frequency can be reprogrammed by a user. Power supply systems of other designs can of course be utilized.

In the illustrated embodiment, each of the supplies operates in tandem with, the other, providing synchronized pulses having the same amplitude, shape, frequency and duty cycle. Desirably, DC pulses having a duration of between 100 and 500 microseconds, and a pulse repetition rate of 5 or less pulses per second, are used so as to provide a "pins and needles" effect on approaching fishes without reducing the fishes' ability to swim away. The amplitude of the pulses can range over a wide value, and the pulse width and frequency can readily be changed (In many embodiments, the amplitude is adjusted in accordance with water conductivity, i.e. low conductivity requires high. voltage). Supply 34a is connected between electrodes 26a and 26b, and, in the illustrated embodiment, provides a potential difference of 100 volts therebetween. Supply 34b is connected between electrodes 26b and 26c and again provides a potential difference of 100 volts. If the voltage on electrode 26a is taken to be zero volts, then the voltage on electrode 26b is 100 volts, and the voltage on electrode 26c is 200 volts. (This is termed a "uniform" or "contiguous" field, in contrast to the "graduated" field disclosed in U.S. Pat. No. 4,750,451.)

Additional electrodes are connected to the power supply system 32 as follows: Electrode 26d is connected to electrode 26b and thus has a voltage of 100 volts. Electrode 26e is connected to electrode 26a and thus has a voltage of 0 volts.

An advantage associated with having three or more electrodes operated at different voltages is the shape of the electric fields produced thereby. In prior art arrangements in which only two voltages are involved (e.g. FIG. 1a), the fields from one electrode are directed immediately to adjacent: electrodes having the other voltage. The fields are thus tightly grouped along the axis of the array. In the FIG. 4 embodiment, in contrast, fields extend not just between adjacent electrodes, but between all electrodes with different voltages. Thus, the field produced by electrode 26a extends not just to electrode 26b, but also to 26c. The resulting fields are no longer tightly grouped around the axis of the array, but extend broadside in order to couple non-adjacent electrodes. This geometry provides a substantial electrical field component perpendicular to the axis of the array, providing head-tail stimulation of the fish. This broadside extension of the electric fields is even more pronounced in systems having more than three voltages. (The preferred embodiment has six power supplies additively connected to provide seven different voltages.) The consequence, to fish, is that they sense the fields from locations remote from the array itself. Fish thus have the opportunity to turn and swim away before reaching a dangerous field strength.

Figure 5A:
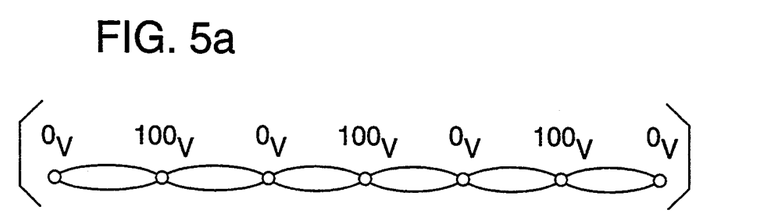
FIGS. 5a and 5b represent the electric fields produced by a prior art array, and by an array according to the present invention, respectively.
Figure 5B:
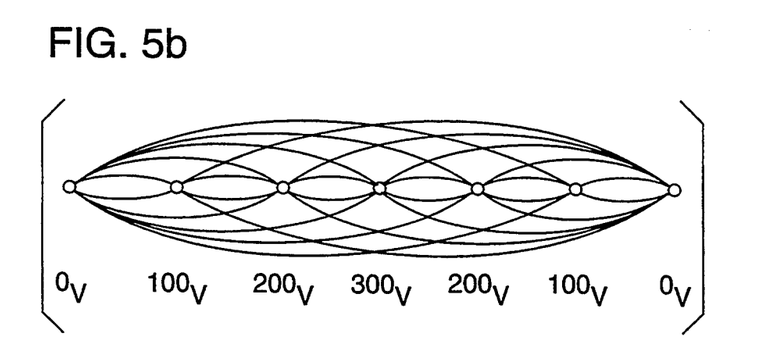

FIGS. 5a and 5b pictorially represent the above-described effect. FIG. 5a represents the relative field strength associated with a two-voltage (i.e. one potential difference) system, such as that of FIG. 1a. As can be seen, the resulting fields do not extend far from the array. In contrast, FIG. 5b represents the fields associated with a four voltage system. As can be seen, the resulting fields extend much further broadside of the array.

Figure 6:
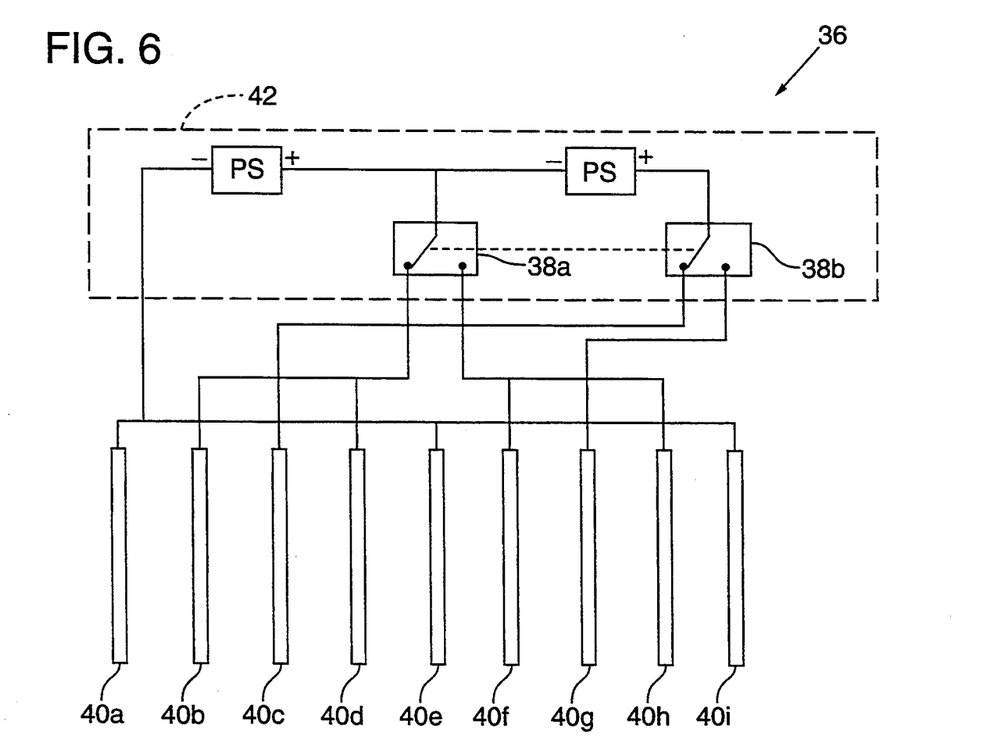
FIG. 6 shows an embodiment of the present invention employing time-multiplexing to reduce peak power requirements of the array.

In large arrays, peak power requirements can be prohibitive. Accordingly, it is sometimes desirable to drive different groups of electrodes in time-multiplexed fashion. In an illustrative embodiment 36 shown in FIG. 6, the array is driven in two sets by the tandem operation of switches 38. When switches 38 are in the depicted position, a set including electrodes 40a, 40b, 40c, 40d, 40e and 40i is activated. When switches 38 are in the opposite position, a set including electrodes 40a, 40e, 40f, 40g, 40h and 40i is activated. In this particular embodiment, electrodes 40a, 40e and 40i are driven regardless of the position of switches 38, although in other embodiments, entirely distinct groupings of electrodes can be driven. By driving the electrodes in staggered sets, significant savings can be effected in the cost of the associated power supply system 42.

Figure 7A:
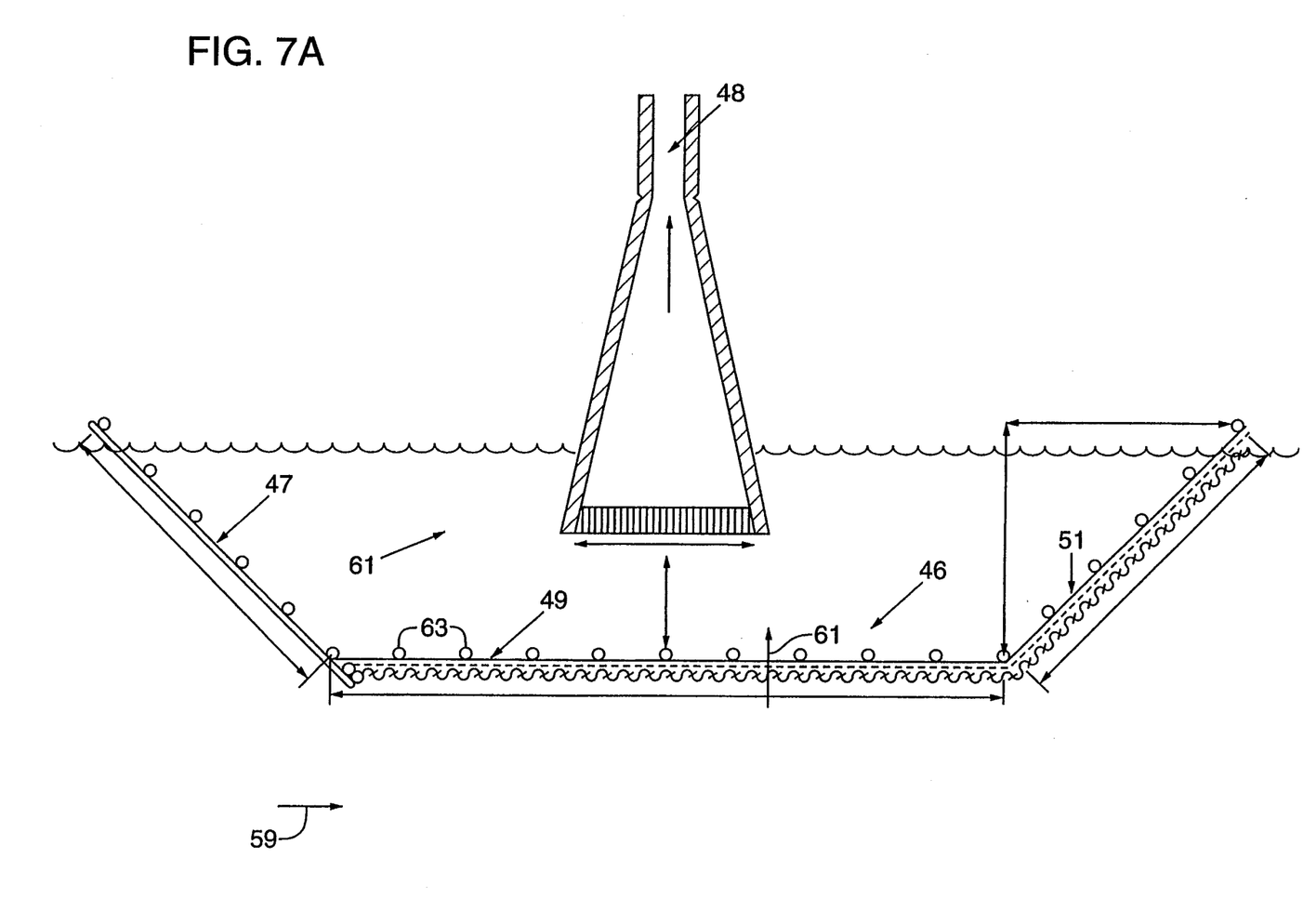
FIGS. 7a and 7b show embodiments of the present invention applied to screen fish from a pump intake on the side of a river.
Figure 7B:
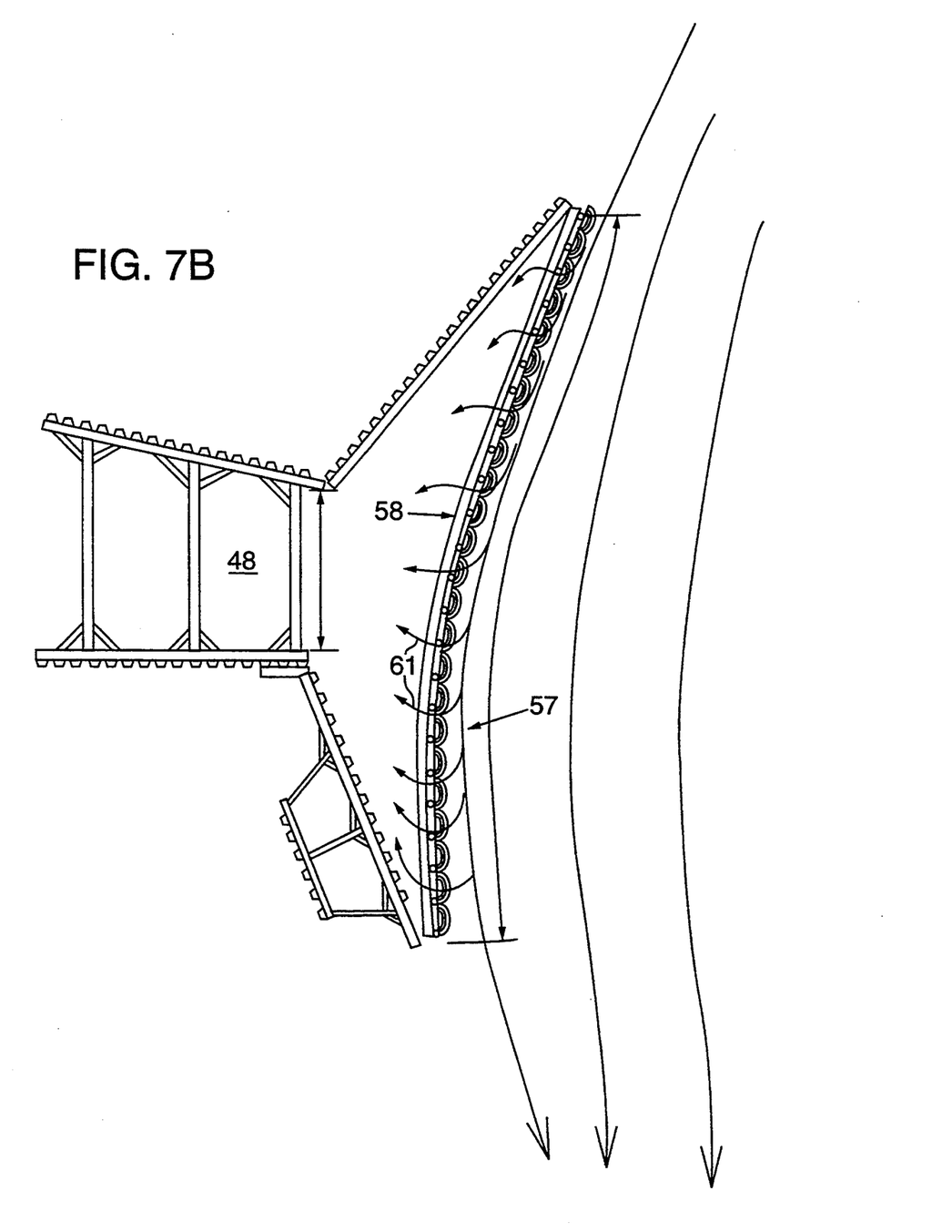

The foregoing curtain arrays can be employed in a number of diverse applications. FIGS. 7a and 7b, for example, show curtain arrays employed in barriers 46 used to screen fish from a pumping intake 48 on the side of a river 50.

As in the foregoing embodiments, the FIG. 7 arrangements include a number of electrodes 56 (particularly shown in FIG. 8)—in this instance defining a perimeter about the pump intake 48. The FIG. 7 embodiment has a further feature: flow distribution (here used to effect equalization) along the length of the barrier.

Migrating fish instinctively swim in the direction of water flow. If the through-barrier flow can be minimized along the length of the barrier, fish will be less inclined to swim in that direction. It is desirable that the river flow 59 adjacent the barrier (the so-called "bypass flow") be at least two times the water flow 61 through the barrier (the so-called "attraction flow" or "aperture flow"). Preferably, the ratio is significantly higher, such as 4:1 of more.

Flow through the barrier is a function of many variables. One is fixed: the pumping rate. Others can be controlled.

One way to control the attraction flow is by the surface area of the barrier. In the FIG. 7a embodiment, the pumping rate may be 460 cubic feet per second (CFS). By drawing this water through a barrier of large area, the flow per unit area will be reduced. One way to increase the barrier area is to increase its length (which typically entails spacing it away from the pump intake). Another is to increase its height, i.e. dredging the river to increase the water depth, again providing a greater surface area through which the water can be drawn.

In the FIG. 7a embodiment, the former approach is used. The pump culvert is 12 feet wide by 10 feet high, or 120 square feet. At a rate of 460 CFS, this gives a flow rate of 3.83 feet/sec through the pump culvert. The barrier 46, however, distributes this 460 CFS flow over a total surface area of 937 square feet. This yields an average flow rate of just 0.49 feet/second through the barrier.

(The illustrated barrier has three sections. The leading edge 47 is a 50 foot planked wall (no water through-path), which serves, in part, to deflect debris from the pump intake. (This is aided by extension of this wall out beyond the adjoining section 49.) The section 49 parallel to the river flow is 100 feet long and the river depth is 15 feet, or 1500 square feet. Half of this area is aperture (discussed further below), or 750 square feet. The trailing edge 51 is another 50 foot section returning to the high water shoreline, again with half aperture, yielding another 187 square feet.)

As so-far described, the through-barrier water flow 46 (attraction flow) will be greatest at positions nearest the pump intake 48. In order to assure minimum attraction of fish, this flow should be equalized along the length of the barrier.

Figure 8A:
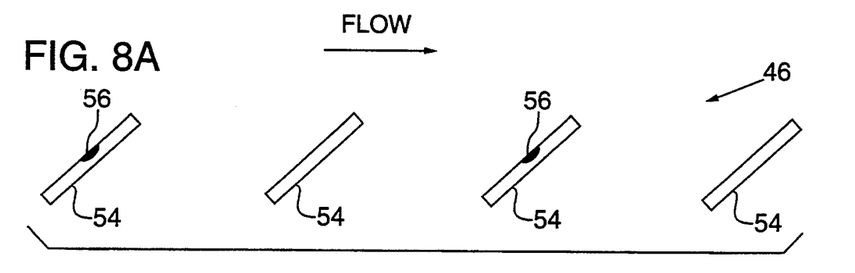
FIGS. 8a and 8b show top views of picket fence and louver physical barriers than have electrodes integrated therewith.

The are a number of ways to effect flow equalization. One, shown in FIG. 8a, is to use pivoting louvers 54. By changing the angular orientation of the louvers, a greater or lesser flow of water through different parts of the barrier can be established. The inclination of the louver members can also serve to deflect debris away from the openings.

Figure 8B:
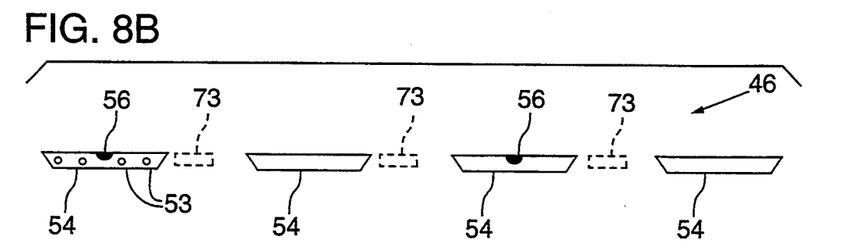

The presently preferred embodiment uses a different system, namely a "picket fence" arrangement, in which barrier elements 54 are spaced to define a fence-like structure (FIG. 8b). To control the flow, filler members 73 (which may be called flow distribution elements) are positioned between the barrier elements to controllably block the openings therebetween. That is, filler members are positioned to make the openings smaller near the pumps, and larger at locations more remote from the pumps. This is typically implemented with the aid of a water velocity meter. The attraction flow is checked at different locations along the barrier, and filler members are added or removed as necessary to achieve equalized flow.

Desirably, the electrodes 56 are integrated with the barrier elements 54. This helps protect the electrodes from damage and results in a simpler structure. In the illustrated embodiment, the barrier elements have widths of 12 inches and are arrayed with spaces of 12 inches therebetween. This spacing, however, is closer than is needed for the electrodes 56. Accordingly, only selected ones of the barrier elements 54 (such as every second, third or fourth) are equipped with electrodes 56.

In the illustrated embodiment, the barrier elements 54 are formed of an insulating material, such as high silica content cast concrete, wood, or Fiberglass material, and the electrodes 56 (which may be rebar steel rods) are mounted therein. To reinforce the barrier elements, epoxy-insulated steel or Fiberglass strengthening members 53 can be used. The filler elements 73 are commonly made of the same insulating material as the barrier elements 54—most commonly wood.

Figure 9A:
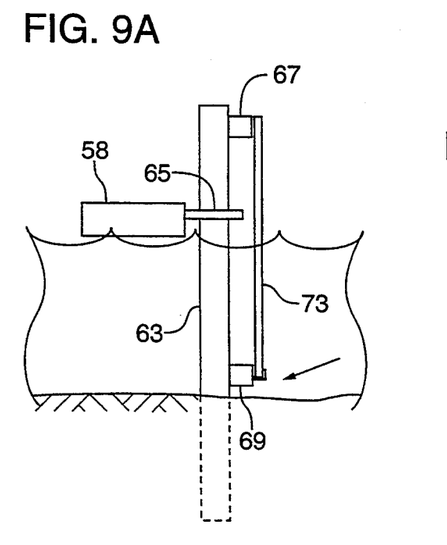
FIGS. 9a and 9b show the use of filler boards to control the openings between adjacent picket elements.
Figure 9B:
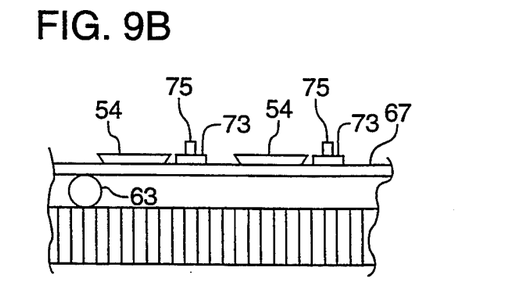

FIGS. 9a and 9b are side and top views showing the mounting arrangements of the filler elements in the barrier 46 of FIG. 7. Pilings 63 are driven into the river bottom at ten foot intervals. A walkway 58 (used to facilitate maintenance and changing of barrier openings) is secured to the pilings by couplings 65 that slide up and down the piling with changes in river level. Extending between adjacent pilings 63 are upper and lower crossmembers 67 and 69. The bottom cross member 69 includes an upwardly opening channel 71 extending along its length. Filler boards 73 (such as two-by-fours or two-by-sixes, desirably with backing members 75 to reduce flexing) are lowered into the river and positioned with their ends lodged in channel 71. The upper ends of the boards 73 are then secured to the top crossmember 67 by suitable fasteners.

The FIG. 7b barrier 46 further includes a log boom 57 that protects the physical barrier elements 54 from floating debris, and serves to keep curious boaters at a distance. Running the length of the log boom is a submerged, grounded cable that tends to confine the electric fields to the barrier side of the boom and provides an abrupt edge to the electric field —enhancing the startle effect to fish.

With the foregoing arrangement, the equalization of flow along the length of the barrier is achieved by the same structure that generates the electrical fields. As a further benefit, the barrier tends to divert river-borne debris from the pump intake. The integration of an electrified barrier in this structure greatly reduces the demands on the physical barrier since it needn't bar fish. Consequently, the barrier can operate with openings much larger than those required by strictly mechanical fish barriers, obviating constraints that plague mechanical fish barriers. The dominance of the river flow over the attraction flow, in cooperation with the electrical fields provided by the electrode array, proves highly effective in reducing diversion of fish into the pump intake.

From the foregoing, it will be apparent that the present invention, in its various embodiments, is effective in reducing diversion of fish into water intakes, and provides numerous advantages over the prior art.

Having illustrated and described the principles of my invention with reference to a preferred embodiment and several variations thereof, it should be apparent to those skilled in the art that the invention can be modified in arrangement and detail without departing from such principles. For example, while the invention has been illustrated with reference to a pulsed DC driving signals, it will be recognized that other signals can alternatively be used. Similarly, while the invention has been disclosed with reference to arrays employing vertically oriented electrodes, it will be recognized that certain principles thereof are equally applicable to other electrode configurations. Still further, while the invention has been illustrated with reference to the use of filler members to equalize the attraction flow along a barrier's length, it will be recognized that other arrangements, such as pivoting louvers, can be used with similar effect.

In view of the many possible embodiments to which the principles of my invention can be put, it should be recognized that the detailed embodiments are illustrative only and should not be taken as limiting the scope of my invention. Rather, I claim as my invention all such embodiments as may come within the scope and spirit of the following claims and equivalents thereto.

I claim:

1. In a method of diverting water through an intake, a method of reducing diversion of fish including:
   generating electrical fields along a perimeter bounding the intake; and
   distributing water flow through the perimeter at several positions therealong, said distributing including defining different opening areas per unit of perimeter area at said several positions;
   wherein the distribution of water flow is achieved by the same structure that generates the electrical fields.

2. The method of claim 1 in which the distributing comprises equalizing the water flow through the perimeter at several positions therealong.

3. The method of claim 1 in which the generating step includes:
   providing at least first, second and third fixed electrodes, each having a substantial vertical component;
   applying pulsed electrical signals to the electrodes, the first, second and third electrodes having voltages $E_1$, $E_2$ and $E_3$, respectively, wherein voltages $E_1$, $E_2$ and $E_3$ are all different.

4. The method of claim 3 in which the potential difference between $E_2$ and $E_2$ is E, the potential difference between $E_2$ and $E_3$ is E, and the potential difference between $E_1$ and $E_3$ is 2E.

5. The method of claim 1 which further includes diverting debris from the intake, wherein the diversion of debris is achieved by the same structure that equalizes the flow and generates ,the electrical fields.

6. An electrified fish barrier disposed in a flow of water, the barrier comprising:
   at least first, second and third elongated, fixed electrodes, the electrodes being vertically disposed and spaced, thereby defining a barrier having openings therethrough;
   a power source for providing pulsed driving signals to said electrodes, the power source and electrodes cooperating to define electrical fields oriented perpendicularly to the direction of water flow through the barrier; and
   flow tailoring structure defining differently sized openings at different positions along the barrier.

7. The barrier of claim 6 in which the electrodes are integrated with the flow tailoring structure.

8. An electrified fish barrier comprising:
   at least first, second and third elongated, fixed electrodes, the electrodes being vertically disposed and spaced, thereby defining a barrier having openings therethrough;
   a power source for providing pulsed driving signals to said electrodes; and
   flow tailoring structure defining differently sized openings at different positions along the barrier, said flow tailoring structure including elongated insulating members disposed between certain of the electrodes.

9. An electrified fish barrier comprising:
   at least first, second and third elongated, fixed electrodes, the electrodes being vertically disposed and spaced, thereby defining a barrier having openings therethrough;
   a power source for providing pulsed driving signals to said electrodes; and
   a flow tailoring structure defining differently sized opening as at different positions along the barrier;
   wherein the power supply provides to each of the three electrodes a different signal.

10. An electrified fish barrier for use in a flow of water, the barrier comprising:
    at least first, second and third elongated, fixed electrodes, the electrodes being vertically disposed and spaced, thereby defining a curtain array; and
    a power source for providing pulsed driving signals having voltages of $E_1$, $E_2$ and $E_3$ to the first, second and third electrodes, respectively, voltages $E_1$, $E_2$ and $E_3$ all being different;
    wherein the elongated electrodes are attached to a least certain of the elongated insulating members and certain ones of said elongated insulating members do not have electrodes attached thereto.

* * * * *